Patented Nov. 17, 1953

2,659,717

UNITED STATES PATENT OFFICE 2,659,717

HIGH-TEMPERATURE POLYMERIZATION OF STYRENE

Harold F. Park, East Longmeadow, Mass., assignor to Monsanto Chemical Company, St. Louis, Mo., a corporation of Delaware No Drawing. Application October 24, 1952, Serial No. 316,787

4 Claims. (Cl. 260—93.5)

This invention relates to a process for preparing polystyrene. More particularly, the invention relates to a process for the mass polymerization of styrene at elevated temperatures to obtain polymers suitable for molding purposes.

Previous to this invention the polymerization of styrene to obtain polymers suitable for molding compositions has been carried out at temperatures below 100° C. in the presence of catalysts such as benzoyl peroxide, ditertiary butyl peroxide, tertiary butyl hydroperoxide and similar well known polymerization catalysts. At the temperatures usually used for mass polymerization, the duration of the polymerization process was generally from 18 to 30 hours and the resulting polymer frequently contained more than 3% methanol-soluble materials which were harmful to the molding powders produced therefrom.

It also has been known that above 100° C., polystyrene polymerizes to polymers having a relatively low degree of polymerization. These low polymers are brittle and cannot be molded into useful articles.

An object of this invention is to provide a new process for polymerizing styrene.

A further object is to provide a process for polymerization of styrene at temperatures above 100° C. to obtain moldable polymers. Still another object is to provide a catalyst for the polymerization of styrene at temperatures above 100° C.

These and other objects are attained by polymerizing styrene or a mixture of styrene with a monomeric material polymerizable therewith, said mixture containing a predominant proportion of styrene, at temperatures between 100° C. and 400° C. in contact with a mixture of 4,4'-dihydroxy benzoyl peroxide and glyoxal.

The following examples are given in illustration and are not intended as limitations on the scope of this invention. Where parts are mentioned, they are parts by weight.

Example

A mixture of 100 parts of pure monomeric styrene and 1.0 part of a mixture of molar equivalent amounts of 4,4'-dihydroxy benzoyl peroxide and glyoxal was placed in a stainless steel pipe capped at one end. The mixture was boiled for about 15 minutes at atmospheric pressure to remove dissolved oxygen. The mixture was then cooled in a nitrogen atmosphere and the other end of the stainless steel pipe was firmly capped so that both ends of the pipe were sealed. The sealed pipe was then placed in a molten tin bath at a temperature of 370° C. and kept in said bath at a temperature of 370° C. for 5 minutes. The pipe was then removed from the bath, cooled to room temperature and opened. A solid transparent rod of polystyrene was obtained which was thermoplastic and could be easily molded by the conventional injection or compression molding processes.

When the process of the example was repeated, using no catalyst or benzoyl peroxide as a catalyst, the product was a friable weak polymer which could not be molded by the conventional molding methods.

The process of this invention may be carried out at temperatures between 100° C. and 400° C. It is preferable to carry out the invention in the absence of oxygen and other materials which are known to cause polymerization at temperatures below 100° C. The length of the polymerization cycle determines to some extent the molecular weight of the polymer produced. A short cycle from 10 to 15 minutes at 400° C. can be used to obtain polymers of considerably higher molecular weight but still moldable in nature. In any event, the polymerization cycle need be no longer than 30 minutes compared with 18 to 30 hours necessary by previous processes.

The amount of catalyst mixture used may vary between 0.01 part and 5 parts per 100 parts of monomer. At the lower part of the range, polymerization is slow unless the higher temperature range is used, and the molecular weight of the polymer is relatively high. At from 3 to 5 parts, the polymerization is quite rapid even at 100° C. and the product is so low in molecular weight that it approaches the lower limit of moldability. In order to obtain the most accurate control of the reaction rate and to produce an optimum range of moldable polymers, the amount of catalyst mixture is preferably restricted to from 0.01 to 1.0 part per 100 parts of monomer. The amounts of the components in the catalyst mixture should be equal on a molar equivalent basis.

The 4,4'-dihydroxy benzoyl peroxide may be prepared by the method described by Price and Krebs in Organic Synthesis, 23, 65 with the exception that p-hydroxy benzoyl chloride is substituted for p-nitrobenzoyl chloride. The process involves adding a benzene solution of p-hydroxy benzoyl chloride to an aqueous solution of sodium peroxide at temperatures in the neighborhood of 0° C. The peroxide is insoluble in the reaction medium and is recovered therefrom by filtration.

Various methods and apparatus may be used for polymerizing styrene under the conditions of this invention. For example it may be polymerized in sealed glass tubes or sealed metal tubes. The monomer or solution of polymer in the monomer may be forced through a heated metal tube or a heated glass tube, or a solution of a partial polymer in the monomer may be forced through a screw extruder, etc. The main precaution to be taken in any of the apparatus is the substantial exclusion of oxygen from the monomer.

In some cases, it may be desirable to polymerize a solution of a polymer of styrene in monomeric styrene. This method results in the use of a viscous liquid as a raw material, such a liquid being more easily handled in continuous operations. In such solutions, the monomer preferably constitutes 60–80 weight percent of the solution.

The process of this invention is applicable to styrene and mixtures of styrene with one or more copolymerizable vinylidene compounds in which mixtures the styrene constitutes the major proportion by weight. Among the compounds which may be polymerized with styrene in the process of this invention are alpha-alkyl styrenes such as alpha-methyl styrene; chlorostyrenes such as p-chlorostyrene, 2,5-dichlorostyrene, divinyl benzene, vinyl pyridine, vinyl quinolines; vinyl esters such as vinyl acetate, vinyl butyrate; acrylic and alpha-substituted acrylic acids and the esters, nitriles and amides thereof such as methyl acrylate, butyl methacrylate, methyl phenacrylate, methacrylonitrile, methacrylamide, etc.; alpha,-beta-ethylenically unsaturated dicarboxylic acids and anhydrides and the esters, amides and nitriles thereof such as maleic acid, maleic anhydride, fumaric acid, fumaronitrile, etc.

This invention provides a simple process for preparing moldable polymers of styrene and copolymers of styrene, in which the styrene is a predominant part, by polymerizing the styrene monomer or monomer mixtures in a matter of minutes rather than a matter of hours or days as has been previously necessary. The process has the further advantage that the products contain substantially no volatile material, are easily molded, and do not deteriorate upon ageing.

This application is a continuation-in-part of copending application Serial No. 128,475 filed November 19, 1949, now abandoned.

It is obvious that many variations may be made in the products and processes of this invention without departing from the spirit and scope thereof as defined in the appended claims.

What is claimed is:

1. A mass polymerization process which comprises polymerizing styrene at 100° C. to 400° C. in from 5 to 30 minutes in contact with a mixture of molecular equivalent amounts of 4,4'-dihydroxy benzoyl peroxide and glyoxal.

2. A mass polymerization process which comprises polymerizing 100 parts of styrene at 100° C. to 400° C. in from 5 to 30 minutes in contact with from 0.01 to 5 parts of a mixture of molecular equivalent amounts of 4,4'-dihydroxy benzoyl peroxide and glyoxal.

3. A mass polymerization process which comprises polymerizing 100 parts of styrene at 100° C. to 400° C. in from 5 to 30 minutes in contact with from 0.01 to 1.0 part of a mixture of molecular equivalent amounts of 4,4'-dihydroxy benzoyl peroxide and glyoxal.

4. A mass polymerization process which comprises polymerizing 100 parts of styrene at 370° C. in 5 minutes in contact with 1.0 part of a mixture of molecular equivalent amounts of 4,4'-dihydroxy benzoyl peroxide and glyoxal.

HAROLD F. PARK.

No references cited.